(12) United States Patent
Lin et al.

(10) Patent No.: US 8,979,953 B2
(45) Date of Patent: Mar. 17, 2015

(54) APPARATUS FOR GENERATING HYDROGEN

(75) Inventors: Yu-Hsiang Lin, Hsinchu County (TW); Po-Kuei Chou, Hsinchu County (TW); Tsai-Hsin Cheng, Hsinchu County (TW); Hsuan-Yi Lu, Hsinchu County (TW)

(73) Assignee: Young Green Energy Co., Hsinchu County (TW)

( * ) Notice: Subject to any disclaimer, the term of this patent is extended or adjusted under 35 U.S.C. 154(b) by 798 days.

(21) Appl. No.: 13/292,098

(22) Filed: Nov. 9, 2011

(65) Prior Publication Data

US 2012/0171083 A1     Jul. 5, 2012

(30) Foreign Application Priority Data

Dec. 30, 2010   (CN) .......................... 2010 1 0622011

(51) Int. Cl.
*B01J 7/00* (2006.01)
*C01B 3/06* (2006.01)
*B01J 7/02* (2006.01)

(52) U.S. Cl.
CPC . *C01B 3/065* (2013.01); *B01J 7/02* (2013.01); Y02E 60/362 (2013.01)
USPC ............ 48/61; 423/648.1; 423/650; 423/651; 423/652

(58) Field of Classification Search
USPC ............. 48/61; 423/648.1, 650, 651, 652
See application file for complete search history.

(56) References Cited

U.S. PATENT DOCUMENTS

| 2003/0138679 A1* | 7/2003 | Prased et al. ................. 429/19 |
| 2006/0147776 A1* | 7/2006 | Sarata et al. ................. 429/30 |
| 2006/0191199 A1* | 8/2006 | Rosenzweig et al. .......... 48/61 |
| 2006/0222911 A1 | 10/2006 | Ord et al. |
| 2008/0014481 A1* | 1/2008 | Fiebig ........................ 429/19 |
| 2008/0026266 A1* | 1/2008 | Kobayashi .................. 429/14 |
| 2008/0263951 A1* | 10/2008 | Kobayashi .................. 48/61 |
| 2008/0274384 A1* | 11/2008 | Finkelshtain et al. ......... 429/19 |
| 2008/0286621 A1* | 11/2008 | Rosenzweig et al. ......... 429/17 |

(Continued)

FOREIGN PATENT DOCUMENTS

| CN | 1845873 | 10/2006 |
| CN | 101394920 | 3/2009 |

(Continued)

OTHER PUBLICATIONS

"First Office Action of China Counterpart Application", issued on Feb. 7, 2013, p. 1-p. 5.

*Primary Examiner* — Kaity Handal
(74) *Attorney, Agent, or Firm* — Jianq Chyun IP Office

(57) ABSTRACT

An apparatus for generating hydrogen including a housing, a reservoir, and a piston is provided. The housing has a top wall, a bottom wall, and a sidewall. The top wall has vents and a protrudent column extending to the interior of the housing. At least one vent communicates with the top wall and the protrudent column and rest of the vents surround the protrudent column. The reservoir is disposed in the housing for storing a solid state reactant and divides the housing into a first chamber and a second chamber. The first chamber is located between the top wall and the reservoir. The second chamber is located between the bottom wall and the reservoir for storing a liquid reactant. The piston is disposed on the bottom wall. The piston is used to push the liquid reactant towards the reservoir to react with the solid state reactant to generate hydrogen.

12 Claims, 8 Drawing Sheets

(56) References Cited

U.S. PATENT DOCUMENTS

| | | | |
|---|---|---|---|
| 2008/0311460 A1* | 12/2008 | Kamitani et al. | 429/35 |
| 2009/0004512 A1 | 1/2009 | Sugimoto et al. | |
| 2009/0017347 A1* | 1/2009 | Damery et al. | 429/19 |
| 2009/0101520 A1* | 4/2009 | Zhang et al. | 205/637 |
| 2010/0104481 A1* | 4/2010 | Curello et al. | 422/112 |
| 2010/0172805 A1* | 7/2010 | Kamitani | 422/112 |
| 2011/0194992 A1* | 8/2011 | Barton et al. | 422/239 |

FOREIGN PATENT DOCUMENTS

| | | |
|---|---|---|
| TW | 200607153 | 2/2006 |
| TW | 200904747 | 2/2009 |
| WO | 2005019098 | 3/2005 |

* cited by examiner

APPARATUS FOR GENERATING HYDROGEN

CROSS-REFERENCE TO RELATED APPLICATION

This application claims the priority benefit of China application serial no. 201010622011.5, filed on Dec. 30, 2010. The entirety of the above-mentioned patent application is hereby incorporated by reference herein and made a part of this specification.

BACKGROUND OF THE INVENTION

1. Field of Invention

The invention relates to an apparatus for generating gas. More particularly, the invention relates to an apparatus for generating hydrogen.

2. Description of Related Art

Hydrogen is widely used in the application fields of medicine and biological science. Further, hydrogen could be applied on anti-aging research and is the natural anti-oxidant. Hydrogen could be obtained from the solid state sodium borohydride ($NaBH_4$) hydrogen storage technique in which the water is introduced into the solid state Sodium Borohydride to generate hydrogen.

For instance, the solid state Sodium Borohydride and water bag could be placed into the same container and an external intruding object is used to pierce the water bag. Thus, the water flows out of the water bag and reacts with the solid state Sodium Borohydride to generate hydrogen. By using the external intruding object to pierce the water bag, the piercing hole may be very small so as not to provide a huge amount of water once and the generation efficiency of hydrogen is affected. Moreover, when the container is a container with a single vent, the vent may be blocked by water due to the placement angle of the container, which leads to poor hydrogen venting result. Thus, the internal pressure of the container increases and the risk of explosion of the container rises.

US patent publication number 20060222911 discloses an apparatus for generating hydrogen in which a spring and a piston are used to provide pressure to trigger the reactions between the reactants to generate hydrogen. US publication number 20090004512 discloses a water supplying apparatus in which a spring and a partition are used to compress the liquid to force the liquid to flow into the reaction chamber. Taiwan patent publication number 200607153 discloses a technique using piston or gasbag to push fuel. Taiwan patent publication number 200904747 discloses a portable hydrogen generator in which the material feeding opening is located at the top of the reaction chamber so that the user could easily supply the liquid reactant and metal material into the reaction chamber through the material feeding opening to carry out the chemical reaction for generating hydrogen.

SUMMARY OF THE INVENTION

The invention provides an apparatus for generating hydrogen having better hydrogen generation efficiency and capable of preventing a vent of the apparatus from being blocked to ensure the generated hydrogen could be successfully exhausted.

The other objects and advantages of the invention could be further comprehended by the technical features disclosed by the invention.

To achieve these and other advantages and in accordance with the purpose of the invention, as embodied and broadly described herein, one embodiment of the invention provides an apparatus for generating hydrogen including a housing, a reservoir, and a piston. The housing has a top wall, a bottom wall and a sidewall connected between the top wall and the bottom wall. The top wall has a plurality of vents and a protrudent column extending to the interior of the housing. At least one of the vents communicates with the top wall and the protrudent column, and the rest of the vents surround the protrudent column. Herein, the reservoir is connected to the sidewall and is disposed in the housing for storing a solid state reactant. The reservoir divides the housing into a first chamber and a second chamber. The first chamber is located between the top wall and the reservoir. The second chamber is located between the bottom wall and the reservoir for storing a liquid reactant. The reservoir communicates with the first chamber and the second chamber. The piston is disposed on the bottom wall. The piston is used to push the liquid reactant towards the reservoir so that the liquid reactant reacts with the solid state reactant to generate hydrogen.

In the apparatus for generating hydrogen mentioned above, the reservoir has a first opening and a second opening respectively communicate with the first chamber and the second chamber. The liquid reactant flows into the reservoir through the second opening.

In the apparatus for generating hydrogen mentioned above, the reservoir has a channel communicating with the first chamber and the second chamber, and the hydrogen flows to the second chamber through the second opening and flows to the first chamber through the channel.

In the apparatus for generating hydrogen mentioned above, the sidewall has a hollow column structure.

In the apparatus for generating hydrogen mentioned above, a portion of the sidewall surrounding the first chamber is made of transparent material.

The apparatus for generating hydrogen mentioned above further includes a cover body and a filtering element. The cover body is disposed on the top wall, wherein the cover body and the top wall define a third chamber and the cover body has a second vent. The filtering element is disposed in the third chamber, wherein the hydrogen flows to the third chamber through the first vents and is exhausted to an external environment through the filtering element and the second vent.

In the apparatus for generating hydrogen mentioned above, the bottom wall has a block connected to a periphery of the bottom wall to define a fourth chamber, a portion of the piston is located in the second chamber and the other portion of the piston is located in the fourth chamber.

The apparatus for generating hydrogen mentioned above further includes a removable cap body disposed on the block to cover the fourth chamber.

The apparatus for generating hydrogen mentioned above further includes a waterproof vapor-permeable membrane with gas permeability and liquid impermeability disposed on the top wall to cover at least one of the first vents which communicates with the top wall and the protrudent column.

The apparatus for generating hydrogen mentioned above further includes a waterproof vapor-permeable membrane with gas permeability and liquid impermeability disposed on the top wall to cover these first vents surrounding the protrudent column.

The apparatus for generating hydrogen mentioned above further includes a filtering membrane covering the first opening.

The apparatus for generating hydrogen mentioned above further includes a filtering membrane covering the second opening.

Accordingly, in the aforementioned embodiment of the invention, by pushing the liquid reactant towards the reservoir through the piston, a huge amount of the liquid reactant could rapidly contact with the solid state reactant so that the hydrogen generation efficiency increases. Moreover, the top wall of the housing has protrudent column and at least one of the vents communicates with the top wall and the protrudent column. Also, the rest of the vents surround the protrudent column. When the liquid reactant submerges the vents surrounding the protrudent column and the bottom of the protrudent column is not submerged by the liquid reactant, hydrogen could be exhausted from the vent in which communicates with the top wall and the protrudent column. Moreover, when the liquid reactant submerges the bottom of the protrudent column and the vents surrounding the protrudent column are not submerged by the liquid reactant, the apparatus for generating hydrogen may be rotated by various angles for exhausting hydrogen through the vents surrounding the protrudent column. Therefore, the apparatus for generating hydrogen could exhaust hydrogen in various placement angles so as to increase the usage convenience.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention could be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
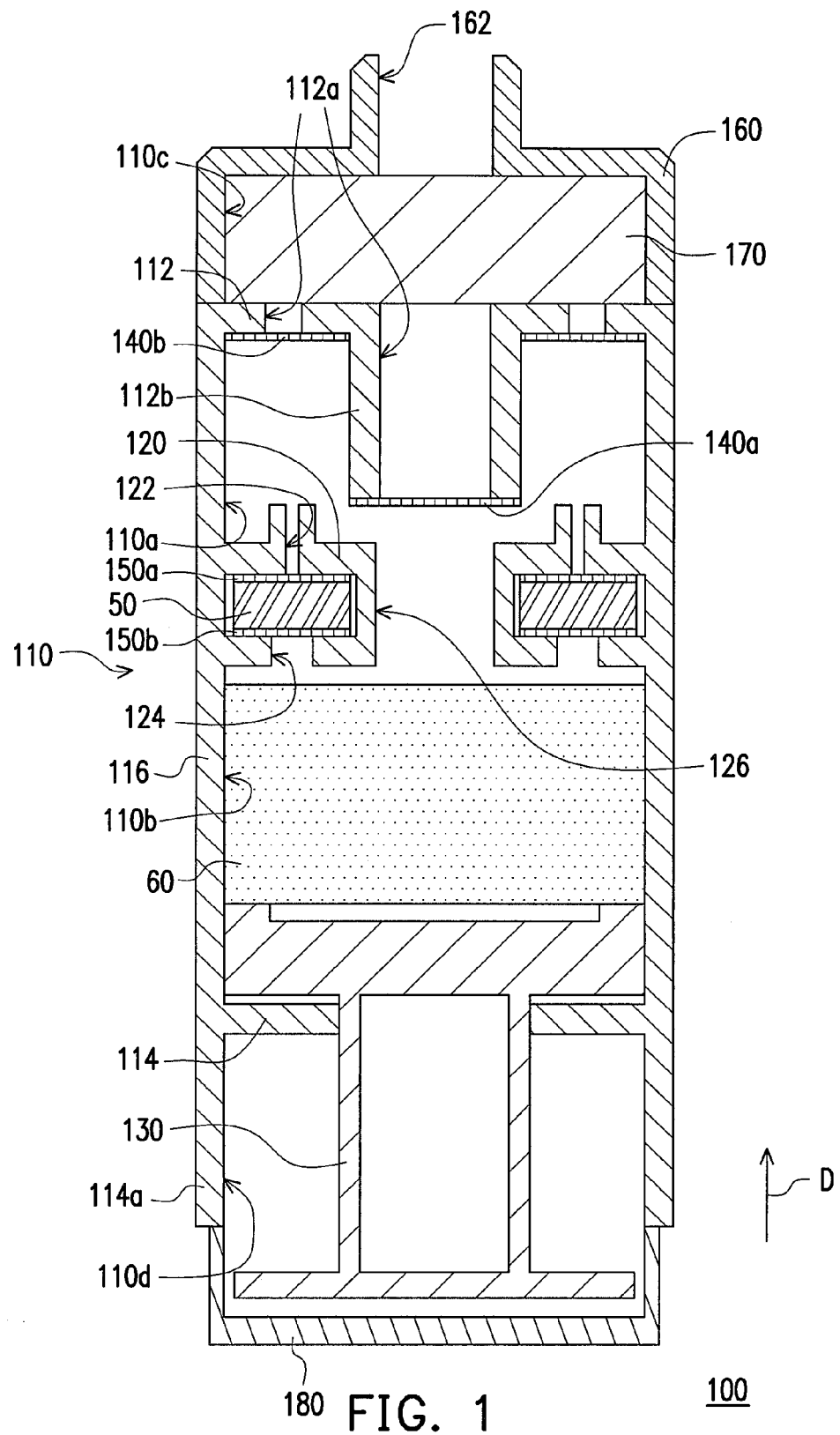
FIG. 1 is a cross-sectional view of an apparatus for generating hydrogen according to one preferred embodiment of the invention.
Figure 2:
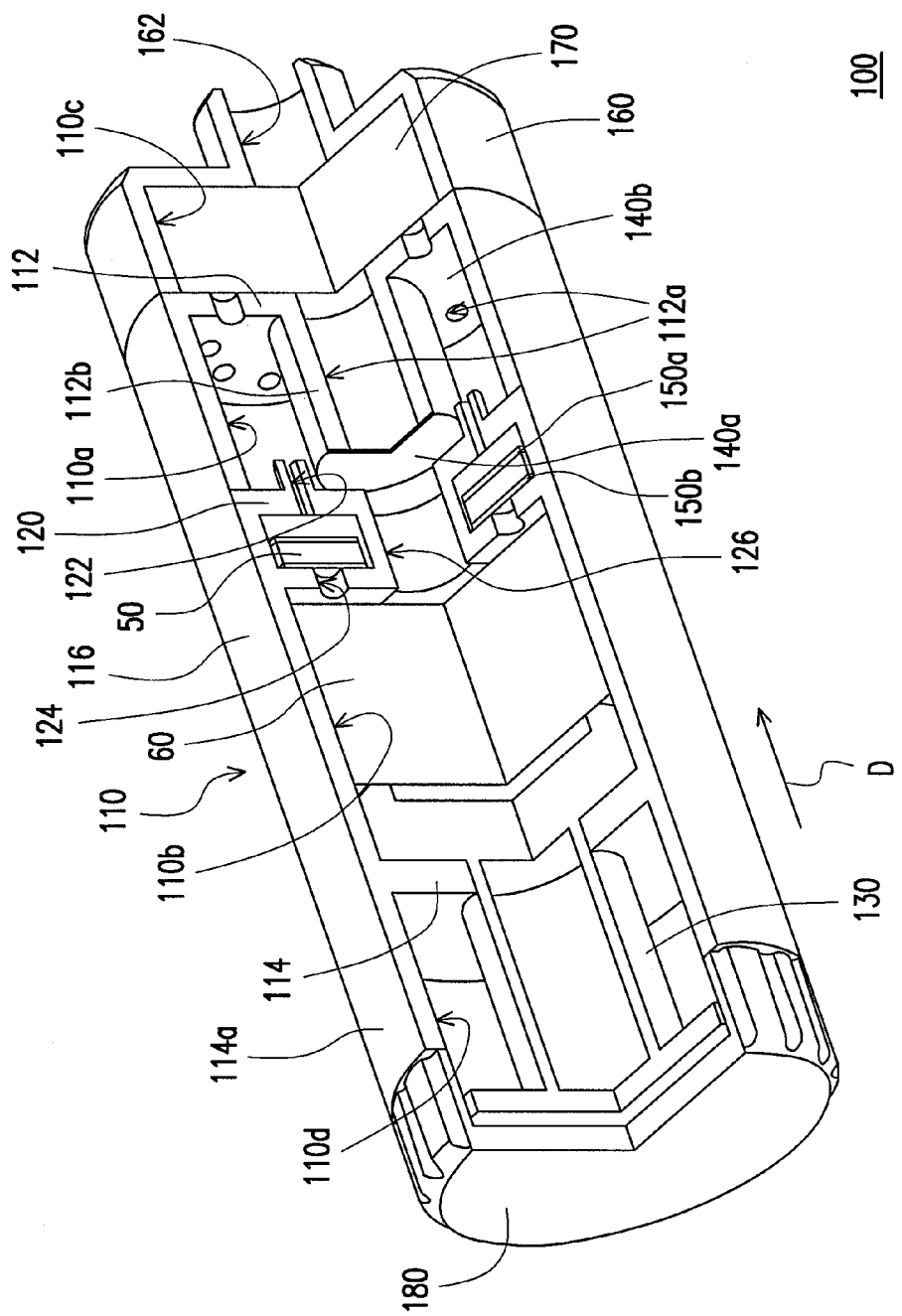
FIG. 2 is a three-dimensional view showing a portion of the apparatus of FIG. 1.
Figure 3:
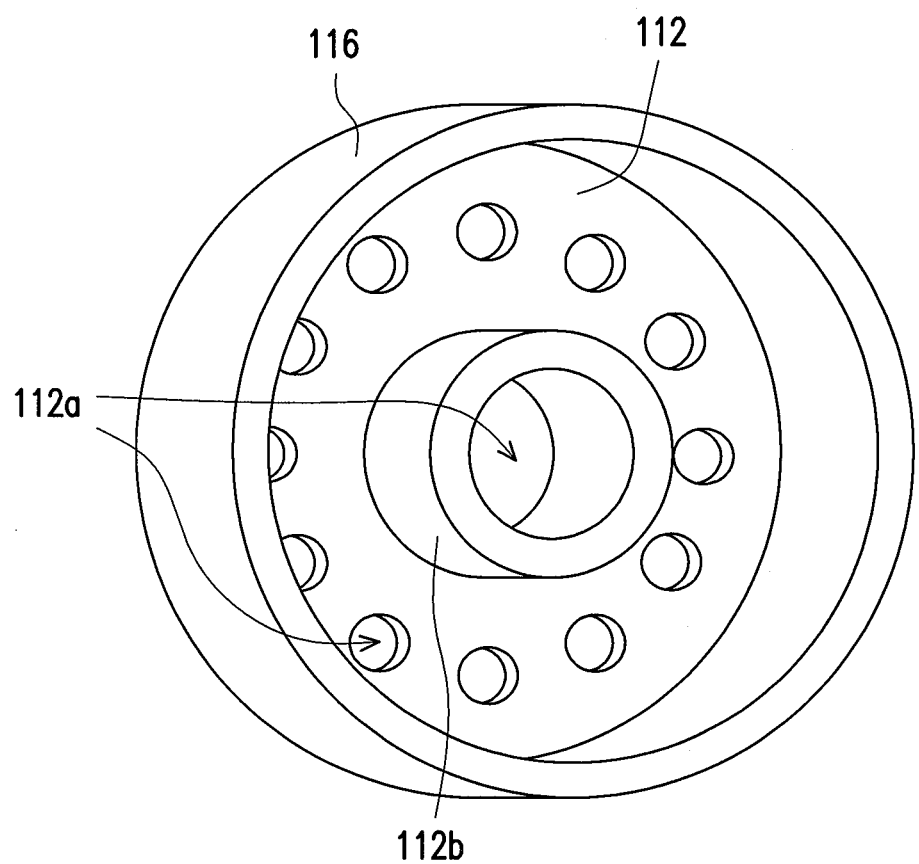
FIG. 3 is a three-dimensional view showing a portion of a housing of FIG. 1.

FIG. 1 is a cross-sectional view of an apparatus for generating hydrogen according to one preferred embodiment of the invention. FIG. 2 is a three-dimensional view showing a portion of the apparatus of FIG. 1. FIG. 3 is a three-dimensional view showing a portion of a housing of FIG. 1. As shown in FIG. 1 to FIG. 3, an apparatus 100 for generating hydrogen of the embodiment includes a housing 110, a reservoir 120, and a piston 130. The housing 110 has a top wall 112, a bottom wall 114, and a sidewall 116 connecting the top wall 112 and the bottom wall 114. The top wall 112 has a plurality of vents 112a, and a protrudent column 112b extending to the interior of the housing 110. At least one of the vents 112a (one vent is shown in the drawings) communicates with the top wall 112 and the protrudent column 112b, and the rest of the vents 112a surround the protrudent column 112b.

The reservoir 120 is connected to the sidewall 116 and is disposed in the housing 110 for storing a solid state reactant 50. The solid state reactant 50 could be, for example, solid state Sodium Borohydride ($NaBH_4$). The reservoir 120 divides the housing 110 into a first chamber 110a and a second chamber 110b. The first chamber 110a is located between the top wall 112 and the reservoir 120, and the second chamber 110b is located between the bottom wall 114 and the reservoir 120 for storing a liquid reactant 60. The liquid reactant 60 could be, for example, water. The reservoir 120 has a first opening 122 and a second opening 124. The first opening 122 and the second opening 124 communicate with the first chamber 110a and the second chamber 110b respectively. The piston 130 is disposed on the bottom wall 114.

Figure 4:
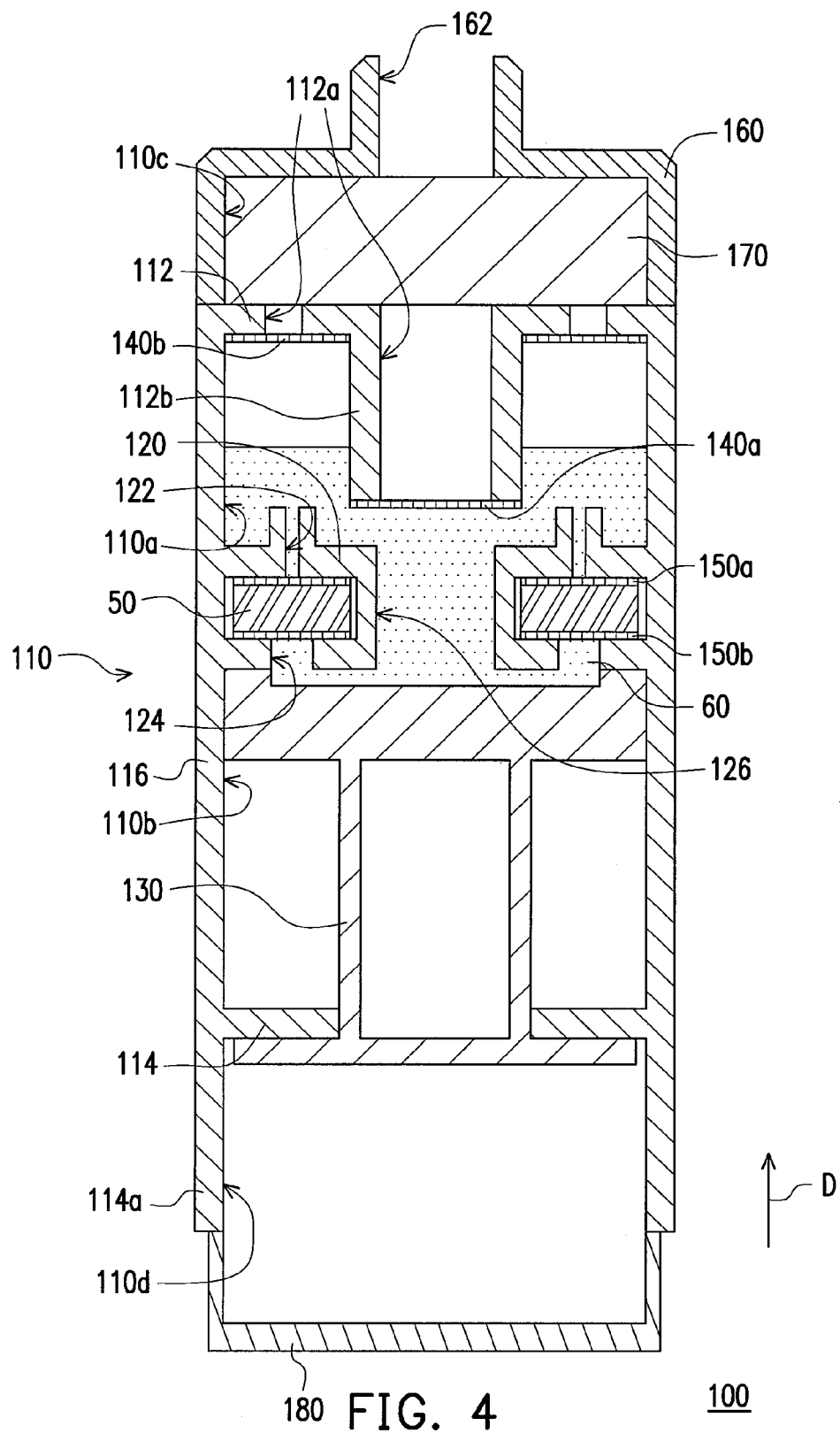
FIG. 4 is a schematic drawing showing a piston pushing a liquid reactant towards a reservoir.

FIG. 4 is a schematic drawing showing a piston of FIG. 1 pushing a liquid reactant towards a reservoir. When using the apparatus 100 for generating hydrogen, the user could push the piston 130 along a direction D so that the piston 130 is transformed from the state shown in FIG. 1 to the state shown in FIG. 4 to push the liquid reactant 60 towards the reservoir 120. Thus, the liquid reactant 60 flows into the reservoir 120 through the second opening 124 and reacts with the solid state reactant 50 stored in the reservoir 120 to generate hydrogen. The hydrogen flows to the first chamber 110a through the first opening 122 and is exhausted out of the housing 110 through the vent 112a.

According to the aforementioned arrangement, when the liquid reactant 60, as shown in FIG. 4, submerges the bottom of the protrudent column 112b and the vents 112a surrounding the protrudent column 112b are not submerged by the liquid reactant 60, the hydrogen generated by the reaction of the solid state reactant 50 with the liquid reactant 60 could be exhausted by the vents 112a surrounding the protrudent column 112b.

Figure 5:
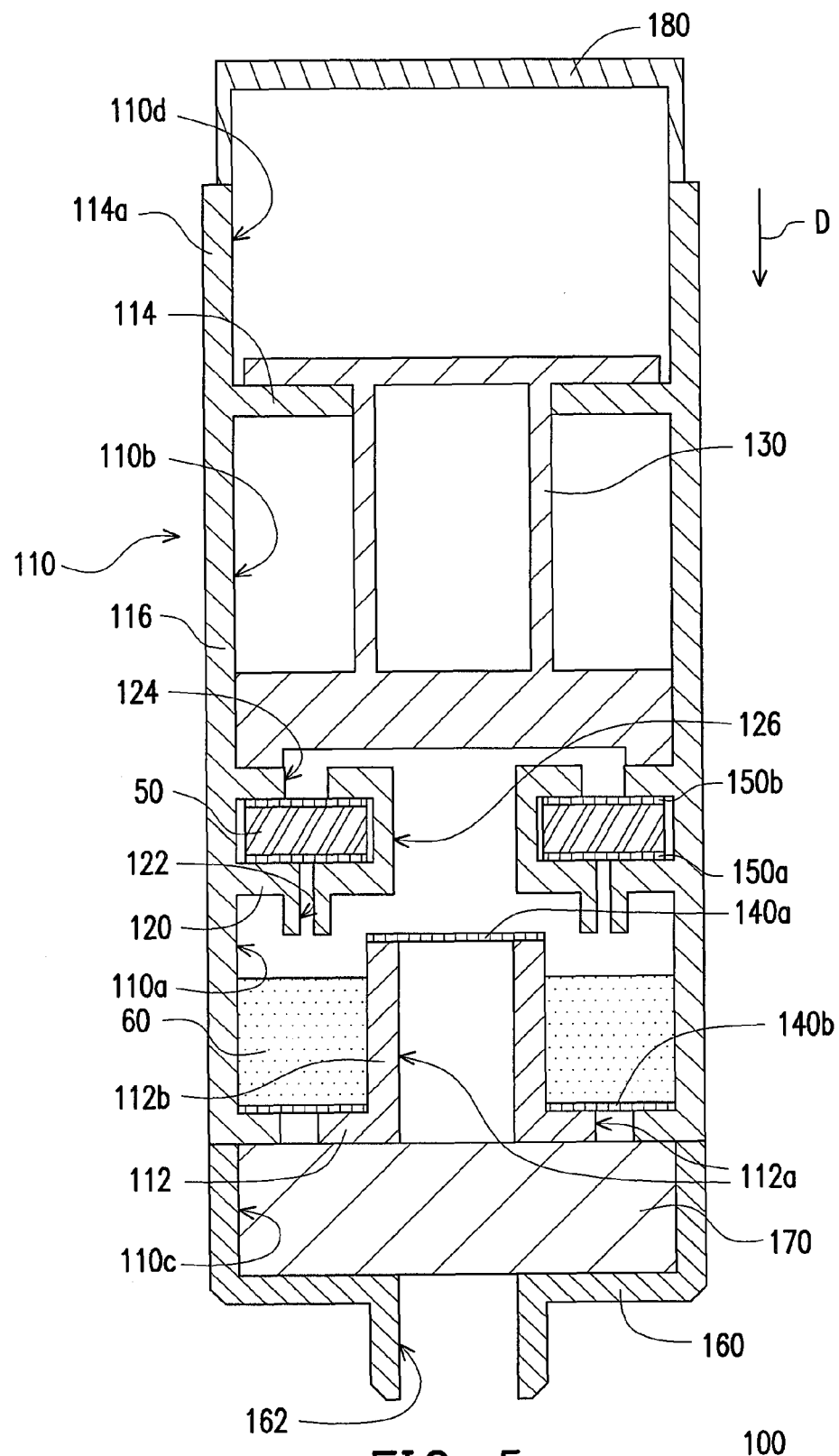
FIG. 5 to FIG. 7 are schematic views showing the apparatus rotated in various angles.
Figure 6:
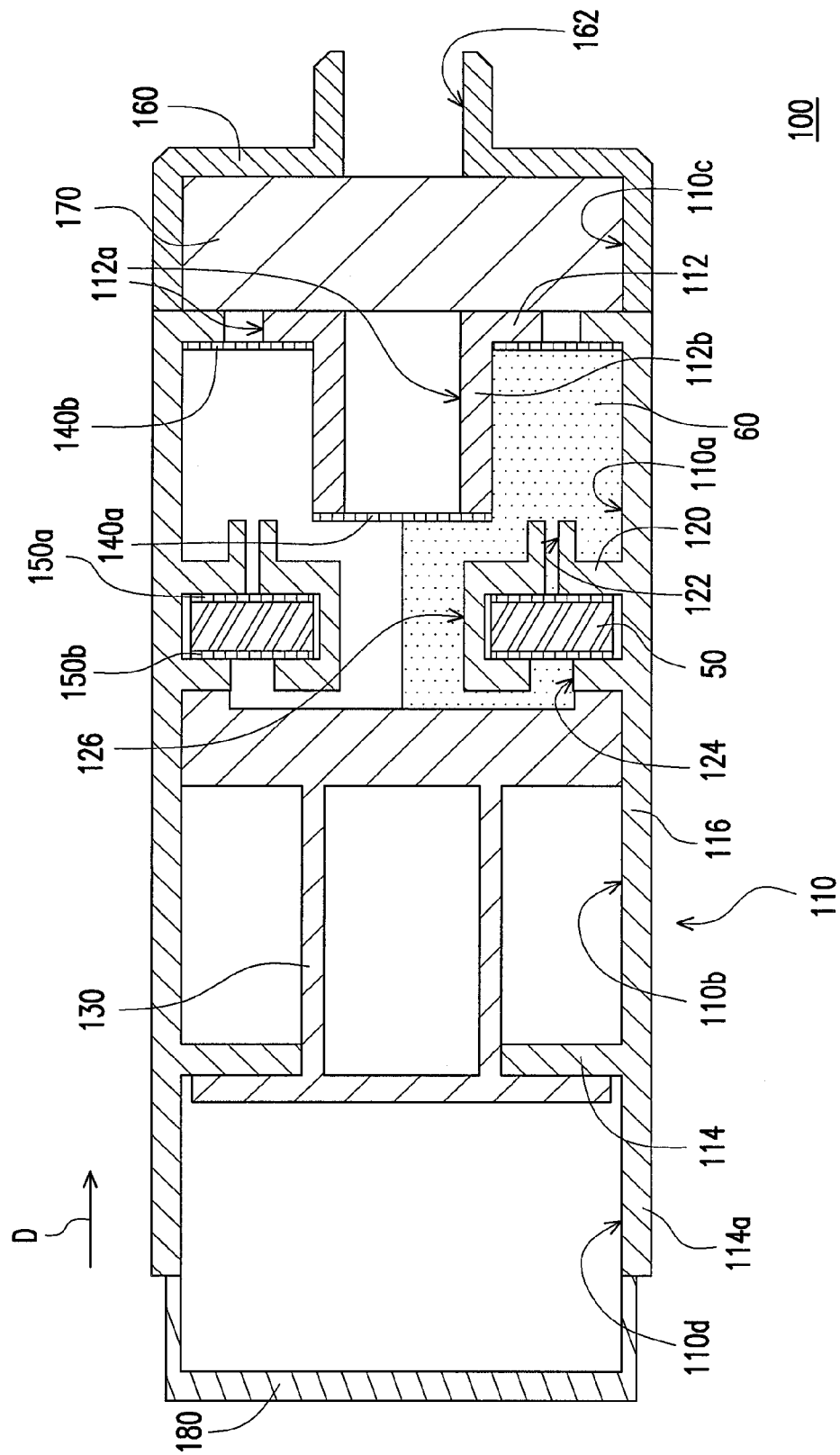
Figure 7:
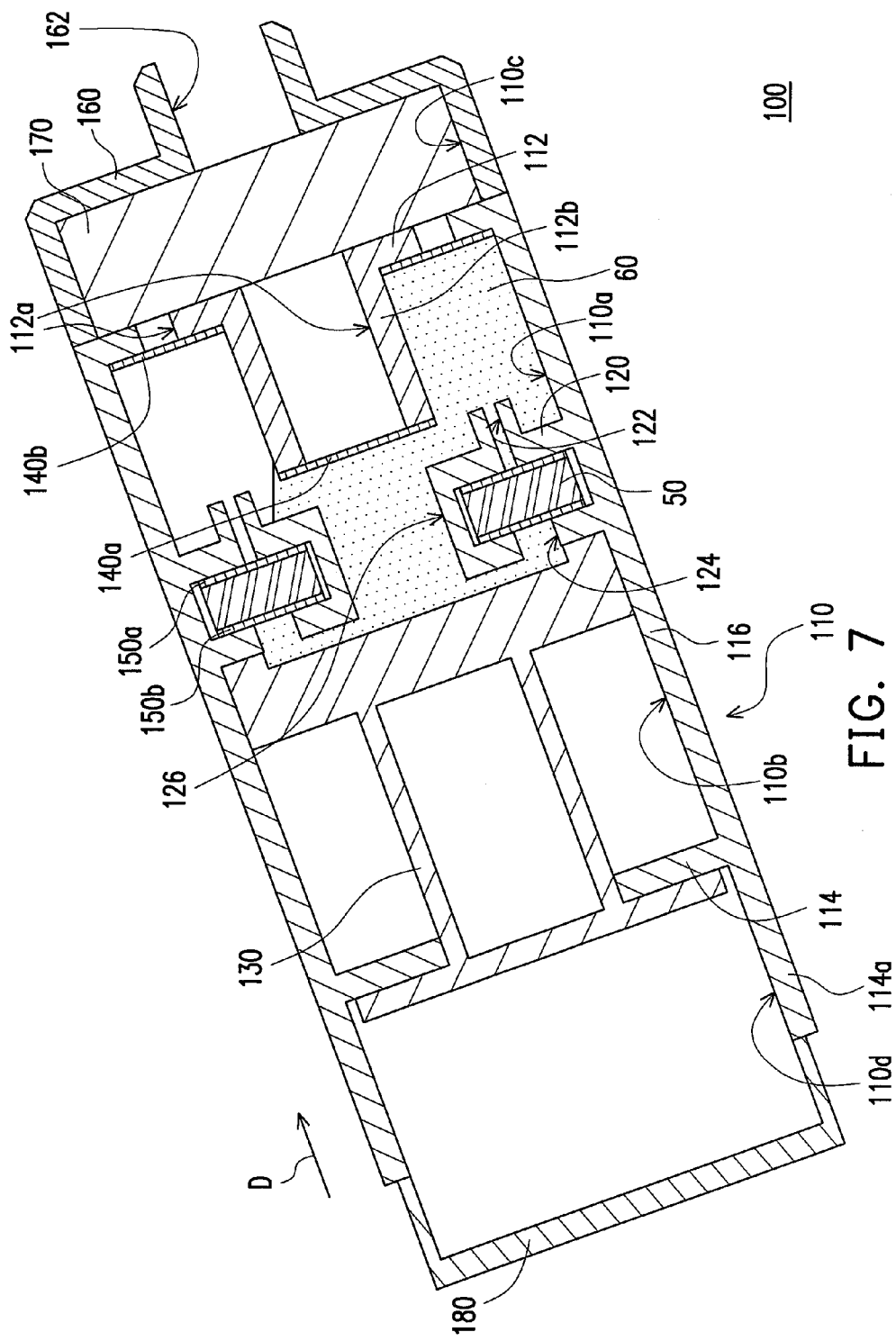

FIG. 5 to FIG. 7 are schematic views showing the apparatus rotating in various angles. As shown in FIG. 5, when the liquid reactant 60 submerges the vents 112a surrounding the protrudent column 112b, and the bottom the protrudent column 112b is not submerged by the liquid reactant 60, the hydrogen generated by the reaction of the solid state reactant 50 with the liquid reactant 60 could be exhausted by the vent 112a communicating with the protrudent column 112b and the top wall 112. As shown in FIG. 6, when the liquid reactant 60 submerges a portion of the vents 112a surrounding the protrudent column 112b and a portion of the bottom of the prodrudent column 112b, and the rest of the vent 112a surrounding the protrudent column 112b and the rest portion of the bottom of the protrudent column 112b are not submerged by the liquid reactant 60, the hydrogen generated by the reaction of the solid state reactant 50 with the liquid reactant 60 could be exhausted by the vent 112a communicating with the top wall 112 and the protrudent column 112b, and the rest of the vents surrounding the protrudent column 112b without being submerged by the liquid reactant 60. As shown in FIG. 7, when the liquid reactant 60 submerges the top of the protrudent column 112b and the vents 112a surrounding the protrudent column 112b without being submerged by the liquid reactant 60, the hydrogen generated by the solid state reactant 50 with the liquid reactant 60 could be exhausted by the vents 112a surrounding the protrudent column 112b. Therefore, the apparatus 100 for generating hydrogen could exhaust hydrogen in various placement angles (as shown in FIG. 4 to FIG. 7) to raising the usage convenience.

In the apparatus 100 for generating hydrogen of the embodiment, the liquid reactant 60 is pushed towards the reservoir 120 by the piston 130 so that a huge amount of liquid reactant 60 could rapidly flow to contact with the solid state reactant 50 stored in the reservoir 120 to increase the hydrogen generation efficiency. More specifically, the liquid reactant 60 of the embodiment is disposed, for example, in the water bag located in the second chamber 110b. When the piston 130 moves along the direction D, the water bad is broken due to the compression so that the liquid reactant 60 within the water bag flows out of the water bag and is pushed into the reservoir 120 by the piston 130. Moreover, the liquid reactant 60 could be directly disposed in the second chamber 110b without a water bag. Meanwhile, a separating film (such as aluminum foil) could be disposed between the liquid reactant 60 and the reservoir 120 for preventing the liquid reactant 60 from flowing towards the reservoir 120. When the piston 130 moves along the direction D, the separating film is broken due to the compression so that the liquid reactant 60 is pushed into the reservoir 120 by the piston 130.

In the embodiment, the reservoir 120 has a channel 126 communicating the first chamber 110a with the second chamber 110b so that the hydrogen generated by the reaction of the solid state reactant 50 with the liquid reactant 60 under the circumstances shown in FIG. 5 and FIG. 6 could be conducted to the second chamber 110b through the second opening 124 and to the first chamber 110a through the channel 126, and then is exhausted out through the vents 112a. Therefore, the number of the venting path for exhausting hydrogen increases and hydrogen exhausting rate increases as well. The sidewall 116 of the housing 110 of the embodiment has a hollow column structure and the reservoir 120 is correspondingly designed to be a circular structure to define the channel 126. Furthermore, a portion of the sidewall 116 surrounds the first chamber 110a is made of transparent material so that it is easy for the user to observe the interior of the first chamber 110a and the hydrogen bubbles in the liquid reactant 60 to determine whether the reaction for generating hydrogen continue.

Specifically, the apparatus 100 for generating hydrogen of the embodiment further includes a waterproof vapor-permeable membrane 140a with gas permeability and liquid impermeability and an impermeable membrane 140b with gas permeability and liquid impermeability. The waterproof vapor-permeable membrane 140a and the waterproof vapor-permeable membrane 140b could be made of the same or different materials. The waterproof vapor-permeable membrane 140a is different from the waterproof vapor-permeable membrane 140b in that the waterproof vapor-permeable membrane 140a covers the vent 112a communicating with the top wall 112 and the protrudent column 112b and the membrane 140b is disposed on the top wall 112 and covers the vents 112a surrounding the protrudent column 112b. By using the waterproof vapor-permeable membrane 140a and the waterproof vapor-permeable membrane 140b as blocks, the liquid reactant 60 could be prevented from flowing out of the housing 110 through the vents 112a.

The apparatus 100 for generating hydrogen of the embodiment further includes a filtering membrane 150a and a filtering membrane 150b. Similarly, the filtering membrane 150a and the filtering membrane 150b could be made of the same or different materials. The filtering membrane 150a is different from the filtering membrane 150b in that the filtering membrane 150a is disposed in the reservoir 120 to cover the first opening 122 and the filtering membrane 150b is disposed in the reservoir 120 to cover the second opening 124. That is, the filtering membrane 150a and the filtering membrane 150b cover different openings respectively. By using the filtering membrane 150a and the filtering membrane 150b as blocks, the particles of the solid state reactant 50 could be prevented from flowing out of the reservoir 120 with the liquid reactant 60. Hence, it could avoid the solid state reactant 50 from entering the first chamber 110a which could be observed by the user.

Moreover, the apparatus 100 for generating hydrogen of the embodiment further includes a cover body 160 and a filtering element 170. The cover body 160 is disposed on the external surface of the top wall 112 so that the cover body 160 and the top wall 112 define a third chamber 110c. The cover body 160 has a vent 162. The filter element 170 is disposed in the third chamber 110c. The hydrogen generated by the reaction of the solid state reactant 50 with the liquid reactant 60 flows to the third chamber 110c through the vents 112a and is further exhausted out to an external environment through the filtering element 170 and the vent 162. The filtering element 170 could be made of, for example, carbon or other adequate filtering material capable of filtering to remove the impurity in the gas. Hence, the amount of impurities in the hydrogen provided by the apparatus 100 could be decreased.

In this embodiment, the bottom wall 114 has a block 114a, and the block 114a is connected to a periphery of the bottom wall 114 to define a fourth chamber 110d. A portion of the piston 130 is located in the second chamber 110b and the other portion of the piston 130 is located in the fourth chamber 110d. The apparatus 100 for generating hydrogen includes a cap body 180, and the cap body 180 is detachably disposed on the block 114a to cover the fourth chamber 110d, such that the piston 130 is prevented from being pushed by user by accident which causing unexpected hydrogen generating reaction. The cap body 180 is able to be removed to allow the user to push the piston 130 to generate hydrogen by the apparatus 100.

Figure 8:
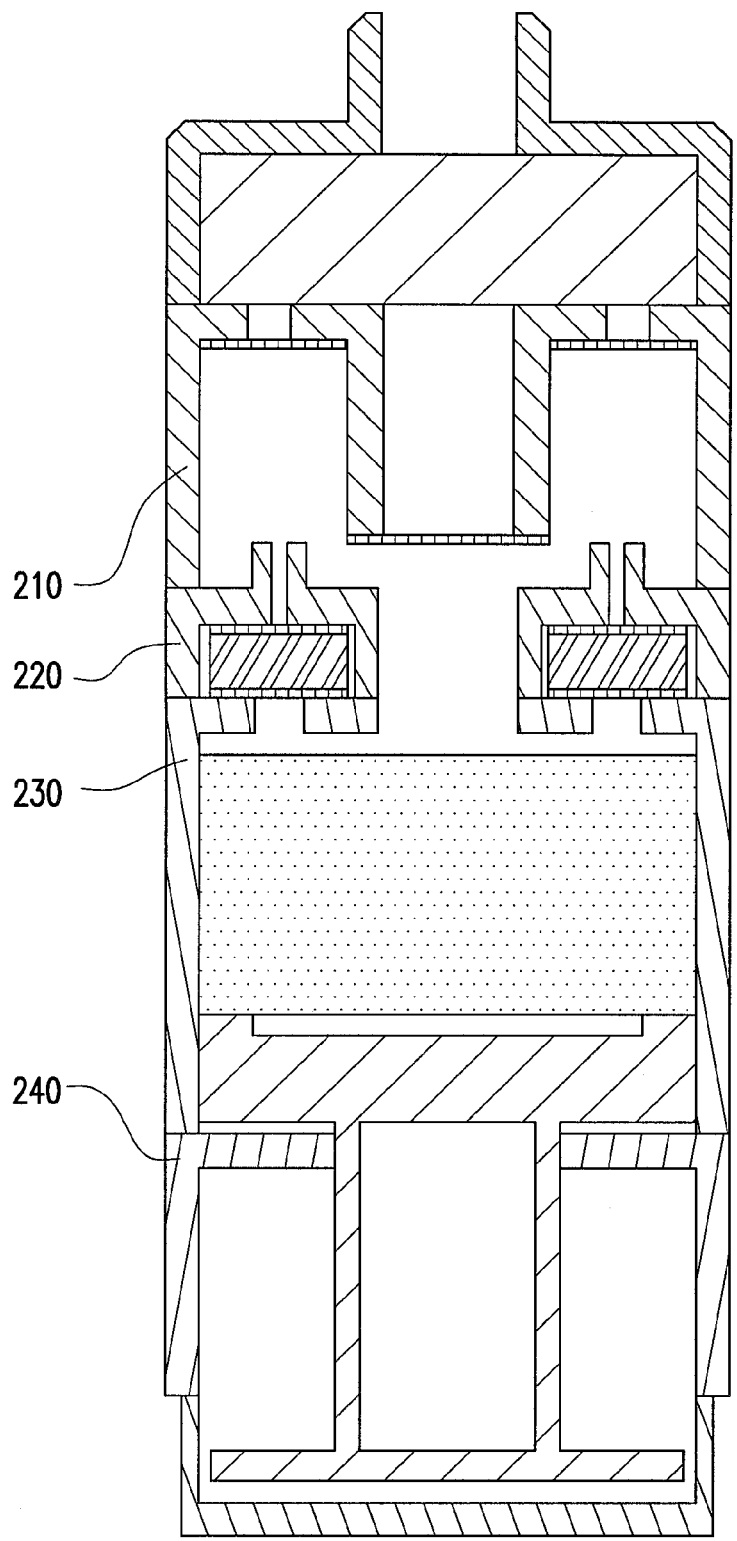
FIG. 8 is a cross-sectional view of an apparatus for generating hydrogen according to another preferred embodiment of the invention.

As shown in FIG. 1, the housing 110 and the reservoir 120 of the embodiment are formed in one piece. However, the invention is not limited to the aforementioned structure. In the following descriptions, FIG. 8 is used as an exemplar. FIG. 8 is a cross-sectional view of an apparatus for generating hydrogen according to another preferred embodiment of the invention. As shown in FIG. 8, in the apparatus 200 for generating hydrogen of the embodiment, the structures similar to the housing 110 and the reservoir 120 are consisted of a component 210, a component 220, a component 230 and a component 240. In other words, the housing 110 and the reservoir 120 could be integrated as shown in FIG. 1 or the component 210, the component 220, the component 230, and the component 240 as shown in FIG. 8 could be separately manufactured and then be integrated.

In the aforementioned embodiments of the invention, the liquid reactant is pushed towards the reservoir by the piston so that a large amount of liquid reactant could rapidly contact with the solid state reactant stored in the reservoir. Thus, the hydrogen generation efficiency increases. Moreover, the top wall of the housing has the protrudent column, at least one of the vents communicates with the top wall and the protrudent column, and the rest of the vents surround the protrudent column. When the liquid reactant submerges the vents surrounding the protrudent column and the bottom of the protrudent column is not submerged by the liquid reactant, hydrogen could be exhausted through the vent communicating with the top wall and the protrudent column. Alternatively, when the apparatus rotates in other angle which leads to that the liquid reactant submerges the bottom of the protrudent column and the vents surrounding the protrudent column are not submerged by the liquid reactant, hydrogen could be exhausted through the vents surrounding the protrudent column. Hence, the apparatus for generating hydrogen could vent hydrogen in various angles so that the usage convenience is improved. Further, a portion of the housing surrounding the first chamber could be made of transparent material so that the user could observe the interior of the first chamber and the hydrogen bubbles in the liquid reactant to determine whether the reaction for generating hydrogen continues.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An apparatus for generating hydrogen, comprising:
   a housing having a top wall, a bottom wall, and a sidewall connecting the top wall and the bottom wall, wherein the top wall has a plurality of first vents and a protrudent column extend to the interior of the housing, at least one of the vents communicates with the top wall and the protrudent column, and rest of the vents surround the protrudent column;
   a reservoir connected to the sidewall and disposed in the housing for storing a solid state reactant, wherein the reservoir divides the housing into a first chamber and a second chamber, the first chamber is located between the top wall and the reservoir, the second chamber is located between the bottom wall and the reservoir and stores a liquid reactant, and the reservoir communicates with the first chamber and the second chamber; and
   a piston disposed on the bottom wall, wherein the piston is used to push the liquid reactant towards the reservoir so that the liquid reactant reacts with the solid state reactant to generate hydrogen.

2. The apparatus for generating hydrogen of claim 1, wherein the reservoir has a first opening and a second opening respectively communicate with the first chamber and the second chamber, and the liquid reactant flows into the reservoir through the second opening.

3. The apparatus for generating hydrogen of claim 2, wherein the reservoir has a channel communicating with the first chamber and the second chamber, and the hydrogen flows to the second chamber through the second opening and flows to the first chamber through the channel.

4. The apparatus for generating hydrogen of claim 2, further comprising a filtering membrane covering the first opening.

5. The apparatus for generating hydrogen of claim 2, further comprising a filtering membrane covering the second opening.

6. The apparatus for generating hydrogen of claim 1, wherein the sidewall has a hollow column structure.

7. The apparatus for generating hydrogen of claim 1, wherein a portion of the sidewall surrounding the first chamber is made of transparent material.

8. The apparatus for generating hydrogen of claim 1, further comprising:
   a cover body disposed on the top wall, wherein the cover body and the top wall define a third chamber and the cover body has a second vent; and a filtering element disposed in the third chamber, wherein the hydrogen flows to the third chamber through the first vent and is exhausted to an external environment through the filtering element and the second vent.

9. The apparatus for generating hydrogen of claim 1, wherein the bottom wall has a block connected to a periphery of the bottom wall to define a fourth chamber, a portion of the piston is located in the second chamber and the other portion of the piston is located in the fourth chamber.

10. The apparatus for generating hydrogen of claim 9, further comprising a cap body detachable disposed on the block to cover the fourth chamber.

11. The apparatus for generating hydrogen of claim 1, further comprising a waterproof vapor-permeable membrane with gas permeability and liquid impermeability, the waterproof vapor-permeable membrane disposed on the top wall to cover at least one of the vents communicating with the top wall and the protrudent column.

12. The apparatus for generating hydrogen of claim 1, further comprising a waterproof vapor-permeable membrane with gas permeability and liquid impermeability disposed on the top wall to cover the vents surrounding the protrudent column.

* * * * *